US011916182B2

(12) United States Patent
Kim et al.

(10) Patent No.: US 11,916,182 B2
(45) Date of Patent: Feb. 27, 2024

(54) WINDING DEVICE FOR MANUFACTURING ELECTRODE ASSEMBLY

(71) Applicant: LG CHEM, LTD., Seoul (KR)

(72) Inventors: Jeeeun Kim, Daejeon (KR); Duk Hyun Ryu, Daejeon (KR); Hyoung Kwon Kim, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 897 days.

(21) Appl. No.: 16/961,962

(22) PCT Filed: Aug. 22, 2019

(86) PCT No.: PCT/KR2019/010707
§ 371 (c)(1),
(2) Date: Jul. 14, 2020

(87) PCT Pub. No.: WO2020/060049
PCT Pub. Date: Mar. 26, 2020

(65) Prior Publication Data
US 2020/0350609 A1   Nov. 5, 2020

(30) Foreign Application Priority Data

Sep. 19, 2018   (KR) .................. 10-2018-0112413

(51) Int. Cl.
*H01M 10/04*   (2006.01)
*H01M 4/04*   (2006.01)
(52) U.S. Cl.
CPC ......... *H01M 10/0409* (2013.01); *H01M 4/04* (2013.01); *H01M 10/0431* (2013.01)

(58) Field of Classification Search
CPC .... H01M 4/04; H01M 10/04; H01M 10/0409; H01M 10/0431; H01M 10/0587;
(Continued)

(56) References Cited

U.S. PATENT DOCUMENTS 7,291,185 B2 * 11/2007 Shiota .................. C23C 14/562
29/25.03
2011/0314627 A1   12/2011 Yu et al.
(Continued)

FOREIGN PATENT DOCUMENTS

CN   105080924 A   11/2015
CN   107615548 A   1/2018
(Continued)

OTHER PUBLICATIONS

Machine Translation of KR 2017-0024571 provided by Search Fit database (Year: 2017).*
(Continued)

*Primary Examiner* — Peter Dungba Vo
*Assistant Examiner* — Joshua D Anderson
(74) *Attorney, Agent, or Firm* — Birch, Stewart, Kolasch & Birch, LLP

(57) ABSTRACT

A winding device for manufacturing an electrode assembly is provided. The winding device includes a main body portion; a winding core for winding an electrode and a separation film; and a foreign particle remover connected to the main body portion and removing foreign particles, wherein the foreign particle remover is formed to surround the winding core while separated from the winding core.

11 Claims, 5 Drawing Sheets

(58) Field of Classification Search
CPC . Y10T 29/43; Y10T 29/435; Y10T 29/49108; Y10T 29/49112; Y10T 29/49114; H01G 13/02
See application file for complete search history.

(56) References Cited

U.S. PATENT DOCUMENTS

| | | | | |
|---|---|---|---|---|
| 2018/0158624 | A1* | 6/2018 | Kaito | ............... H01M 10/04 |
| 2020/0027667 | A1 | 1/2020 | Kaito et al. | |

FOREIGN PATENT DOCUMENTS

| | | |
|---|---|---|
| CN | 108306026 A | 7/2018 |
| CN | 108352261 A | 7/2018 |
| CN | 108372178 A | 8/2018 |
| CN | 207738350 U | 8/2018 |
| JP | 9-147543 A | 6/1997 |
| JP | 2000-232043 A | 8/2000 |
| JP | 2004-171836 A | 6/2004 |
| JP | 2008-152946 A | 7/2008 |
| JP | 2011-233279 A | 11/2011 |
| JP | 2014-66588 A | 4/2014 |
| JP | 2016-197538 A | 11/2018 |
| KR | 10-2011-0139974 A | 12/2011 |
| KR | 10-2012-0052306 A | 5/2012 |
| KR | 10-2015-0076403 A | 7/2015 |
| KR | 10-2015-0092623 A | 8/2015 |
| KR | 10-2015-0125196 A | 11/2015 |
| KR | 10-2015-0137639 A | 12/2015 |
| KR | 10-2018-0012534 A | 2/2016 |
| KR | 10-2017-0024571 A | 3/2017 |
| WO | WO 2017/022337 A1 | 2/2017 |

OTHER PUBLICATIONS

Machine Translation of JP 2004-171836 provided by Search Fit database (Year: 2004).*
Machine Translation of JP 2011-233279 provided by Search Fit database (Year: 2011).*
Extended European Search Report, dated May 14, 2021, for European Application No. 19683674.8.
International Search Report (PCT/ISA/210) issued in PCT/KR2019/010707 dated Dec. 5, 2019.

* cited by examiner

[FIG. 1]  CONVENTIONAL ART
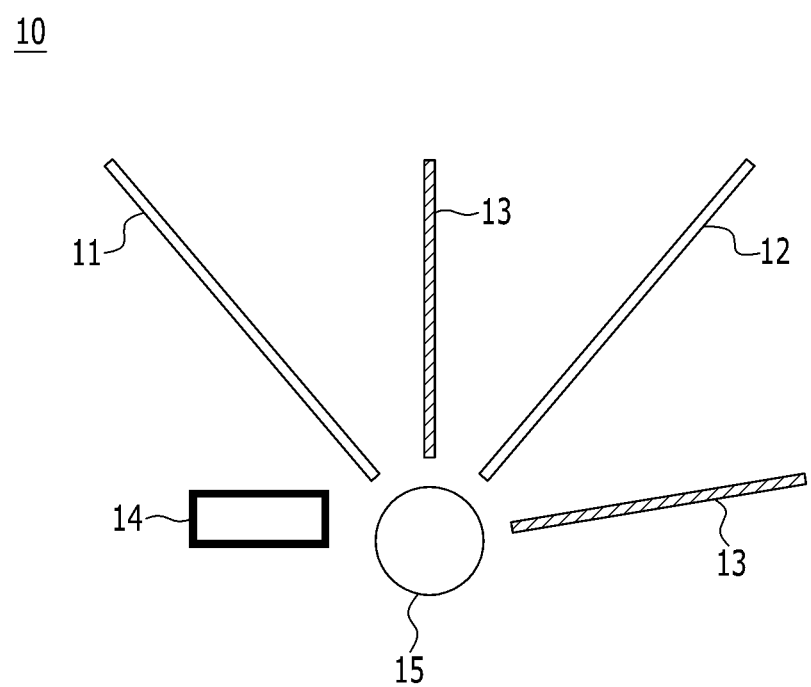

[FIG. 2]
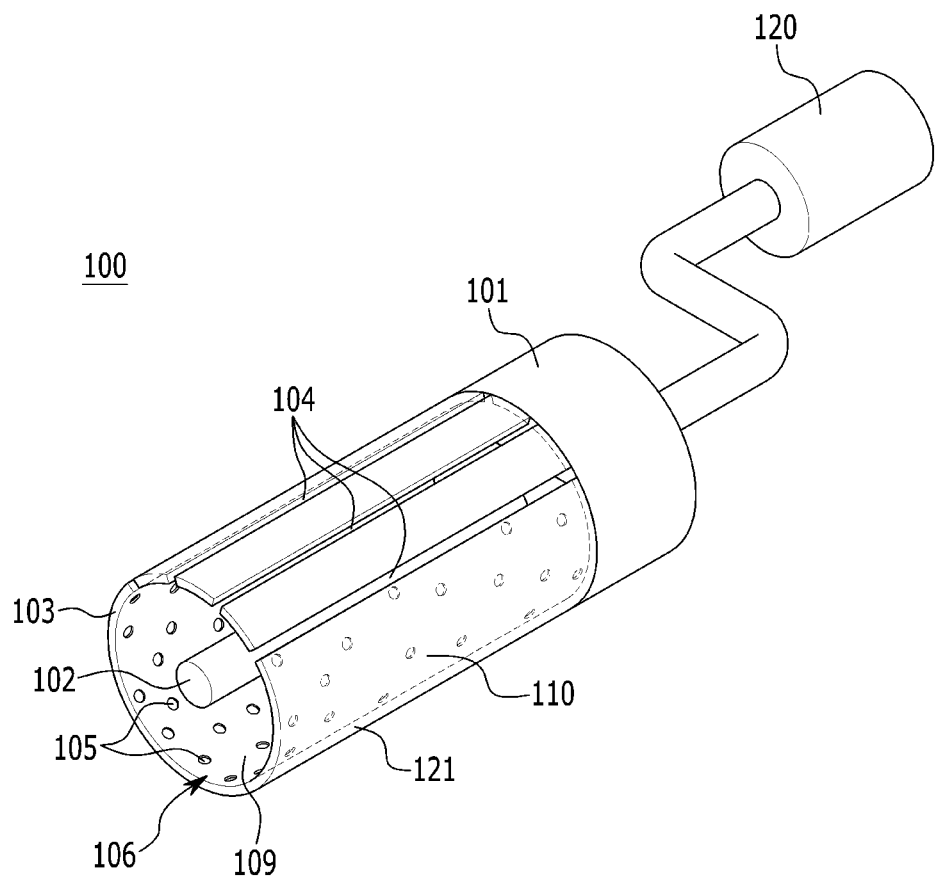

[FIG. 3]
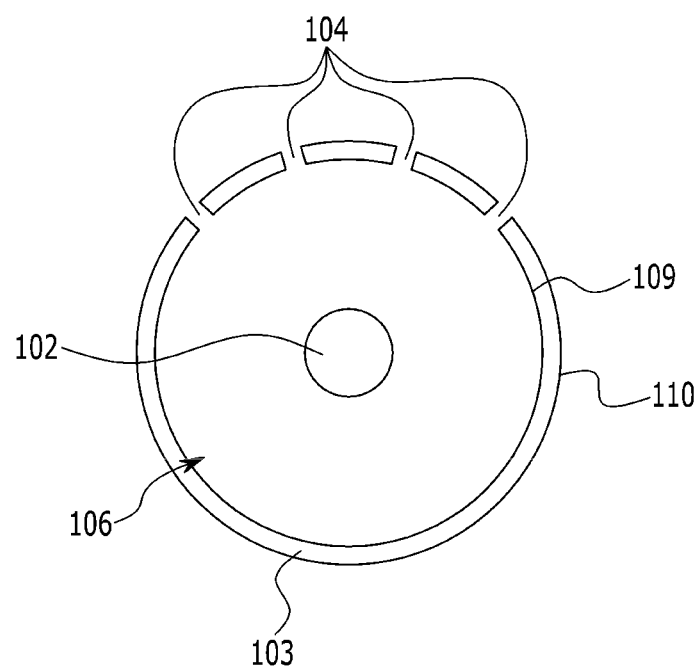

[FIG. 4]
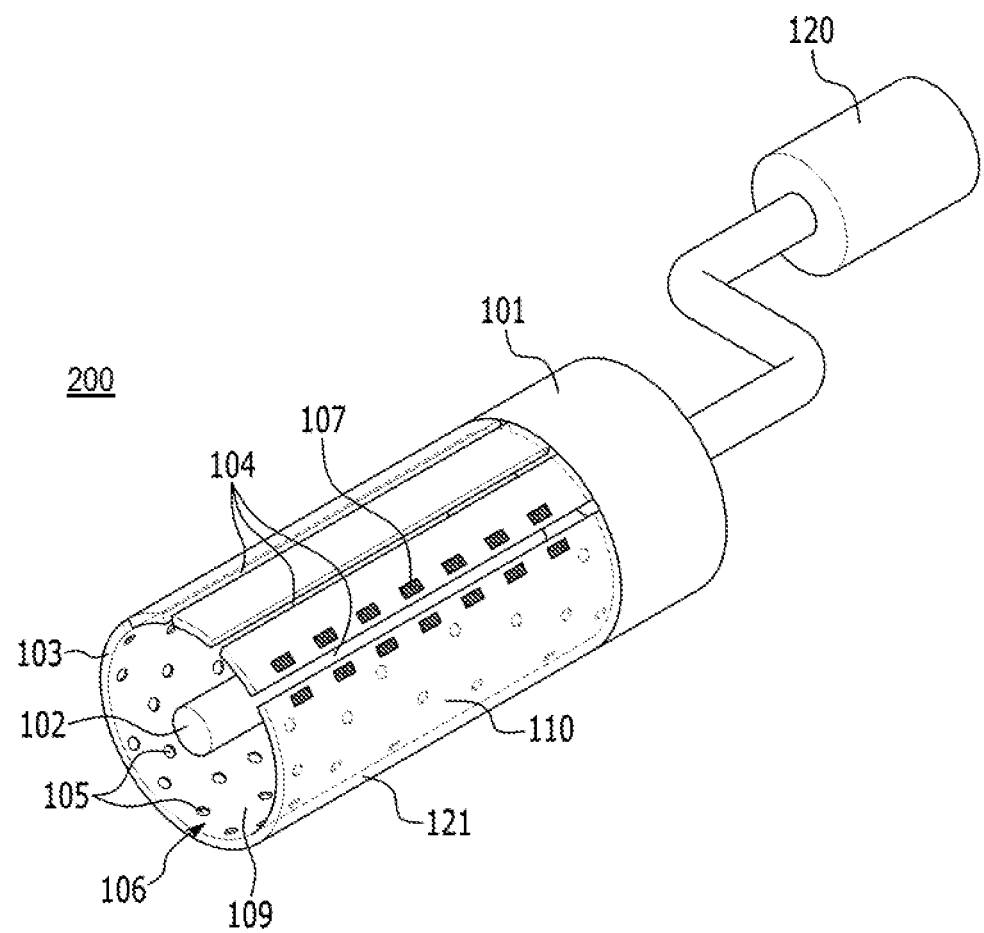

[FIG. 5]
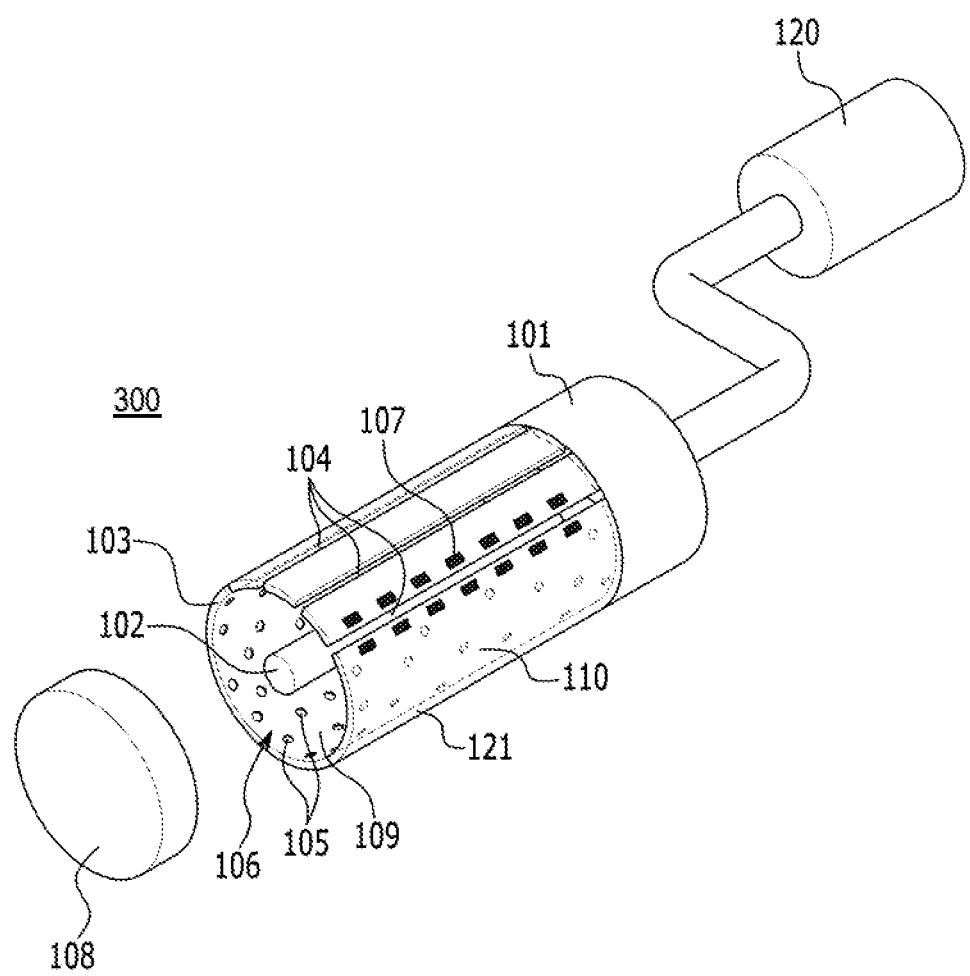

WINDING DEVICE FOR MANUFACTURING ELECTRODE ASSEMBLY

BACKGROUND OF THE INVENTION

(a) Field of the Invention

This application claims priority to and the benefit of Korean Patent Application No. 10-2018-0112413 filed in the Korean Intellectual Property Office on Sep. 19, 2018, the entire contents of which are incorporated herein by reference.

The present invention relates to a winding device for manufacturing an electrode assembly.

(b) Description of the Related Art

Recently, price rise of energy sources caused by exhaustion of fossil fuels, and environmental contamination, have intensified, and demands for environmentally-friendly alternative sources of energy are becoming basic essentials for future life. Accordingly, studies on various electric power generating methods such as nuclear energy, solar power, wind power, and tidal power are in progress, and huge interest in electric power storing devices for more efficiently using energy produced in this way continues.

Further, as technical developments and demands on mobile devices and cell vehicles increase, demands for batteries as an energy source substantially increase, and accordingly, many studies on batteries for satisfying various kinds of demands are currently being performed. Particularly, in the viewpoint of materials, there are high demands on lithium rechargeable batteries such as a lithium ion battery or a lithium ion polymer battery having merits including high energy density, a good discharging voltage, and output stability.

The rechargeable batteries are classified depending on the structures of an electrode assembly in which a positive electrode, a negative electrode, and a separation film provided between the positive electrode and the negative electrode are stacked. Typical ones include a jelly roll type (winding type) of electrode assembly in which a long sheet type of positive electrode and negative electrode are wound while a separation film is provided, and a stacking type of electrode assembly in which a plurality of positive electrodes and negative electrodes cut to a predetermined size of unit are sequentially stacked while a separation film is provided, and recently, in order to solve the drawbacks of the jelly roll type of electrode assembly and the stacking type of electrode assembly, a stacking/folding type of electrode assembly in which unit cells in which positive electrodes and negative electrodes with a predetermined size are stacked while a separation film is provided are sequentially wound while provided on a separation film as an electrode assembly with an advanced structure that is a mixture of the jelly roll type and the stacking type is being developed.

Among the electrode assemblies, the jelly roll type of electrode assembly has merits of easy manufacturing and high energy density per weight, so it is used as an energy source to various kinds of devices from laptop computers to cell vehicles.

FIG. 1 shows a schematic view of a winding portion of a conventional jelly roll type electrode assembly manufacturing apparatus.

Referring to FIG. 1, a positive electrode 11, a negative electrode 12, and a separation film 13 are provided to a winding core 15 and are wound by a winding portion 10 thereby generating a jelly roll. The winding portion 10 is shown, but the jelly roll type electrode assembly manufacturing apparatus includes various elements such as an electrode coalescing unit, an electrode incising unit, and a roller driver, and various metallic and non-metallic foreign particles are generated by operations of the elements. The foreign particles are provided on surfaces of the positive electrode 11 and the negative electrode 12 input to the winding core 15 and are wound altogether, thereby causing drawbacks such as a low voltage and a short circuit.

To solve the drawbacks, a method for removing metallic foreign particles by disposing a device 14 for removing foreign particles on portions of the positive electrode 11 and the negative electrode 12 input to the winding core 15 is used.

However, the above-noted foreign particles are input from various spots in addition to the portions to which the positive electrode 11, the negative electrode 12, and the separation film 13 are input, so the foreign particles may not be efficiently removed by the foreign particle removing device locally installed in the electrode and the separation film.

Therefore, there is a need for skills for fundamentally solving the problem.

SUMMARY OF THE INVENTION

An object of the present invention is to solve the problems of the prior art and technical problems from the past.

The inventors of the present invention, having performed in-depth research and experimentation, confirmed efficient prevention of foreign particles by allowing a winding device for manufacturing an electrode assembly to include a foreign particle remover surrounding a winding core, and forming an inlet inside the foreign particle remover, and completed the present invention.

An exemplary embodiment of the present invention provides a winding device for manufacturing an electrode assembly, the winding device including: a main body portion; a winding core configured to wind an electrode and a separation film of the electrode assembly; and a foreign particle remover connected to the main body portion and configured to remove foreign particles, wherein the foreign particle remover surrounds the winding core while being spaced from the winding core.

The foreign particle remover may include an inflow portion capable of receiving the electrode and the separation film.

The foreign particle remover may have a cylindrical structure.

A diameter of the foreign particle remover may be greater than a diameter of at least the electrode assembly.

The foreign particle remover may include an inlet formed on an inside thereof.

The foreign particles suctioned through the inlet may be discharged to an outside through the main body portion.

The foreign particle remover may be separate from the main body portion.

The foreign particle remover may further include a magnet.

The magnet may be located on the foreign particle remover portion on which the inflow portion is located.

The winding device may further include a cover portion for to cover an opening of the foreign particle remover.

The cover portion may be separate from the main body portion.

BRIEF DESCRIPTION OF THE DRAWINGS

FIG. 1 shows a schematic view of a winding portion of a conventional device for manufacturing a jelly roll type electrode assembly.

FIG. 2 shows a schematic view of a winding device for manufacturing an electrode assembly according to an exemplary embodiment of the present invention.

FIG. 3 shows a cross-sectional view of a winding device for manufacturing an electrode assembly shown in FIG. 2.

FIG. 4 shows a schematic view of a winding device for manufacturing an electrode assembly according to another exemplary embodiment of the present invention.

FIG. 5 shows a schematic view of a winding device for manufacturing an electrode assembly according to another exemplary embodiment of the present invention.

DETAILED DESCRIPTION OF THE EMBODIMENTS

The present invention will be described more fully hereinafter with reference to the accompanying drawings, in which exemplary embodiments of the invention are shown. As those skilled in the art would realize, the described embodiments may be modified in various different ways, all without departing from the spirit or scope of the present invention.

Unless explicitly described to the contrary, the word "comprise" and variations such as "comprises" or "comprising" will be understood to imply the inclusion of stated elements but not the exclusion of any other elements.

The phrase "on a cross-section" means viewing a cross-section of which the object portion is vertically cut from the side.

FIG. 2 shows a schematic view of a winding device for manufacturing an electrode assembly according to an exemplary embodiment of the present invention. FIG. 3 shows a cross-sectional view of a winding device for manufacturing an electrode assembly shown in FIG. 2.

Referring to FIG. 2 and FIG. 3, the winding device 100 for manufacturing an electrode assembly includes a main body portion 101, a winding core 102, and a foreign particle remover 103. An inflow portion 104 for receiving an electrode (not shown) and a separation film (not shown) is formed on the foreign particle remover 103. The electrode and the separation film are input to the winding core 102 through the inflow portion 104 and are then wound.

The inflow portion 104 may have various shapes according to shapes of the electrode and the separation film, and in order to minimize the inflow of foreign particles through the inflow portion 104, it is preferable to form the inflow portion 104 with a minimum inflow size without interference of the electrode and the separation film. In general, the electrode and the separation film have a long sheet shape with respect to width having a constant thickness, so the inflow portion 104 may have a shape to which the sheet may be input.

The shape of the foreign particle remover 103 is not specifically limited, it may be formed in various ways in consideration of desired shapes of the electrode assembly and manufacturing equipment, and it is preferable to form the foreign particle remover 103 in a cylindrical structure that maintains a constant spaced distance from the winding core 102 and surrounds the winding core 102. The foreign particle remover 103 shown in FIG. 2 is formed to have a cylindrical structure. A diameter of the foreign particle remover 103 may be greater than a diameter of the electrode assembly which is at least wound. A length of the foreign particle remover 103 may be equal to or greater than a length of the at least winding core 102.

Here, the length of the foreign particle remover 103 signifies a length defined along the direction in which the winding core 102 extends. When the electrode and the separation film are wound according to the above-noted structure, the inflow of foreign particles to the winding core may be efficiently prevented. A plurality of inlets 105 are formed on an inside 109 of the foreign particle remover 103. Positions in which inlets 105 are formed are not limited, and they may be formed by maintaining a predetermined gap in the inside 109 of the foreign particle remover 103. Depending on the operator's need, relatively many inlets 105 may be formed on specific portion. For example, the inlets 105 be mainly disposed inside the foreign particle remover 103 provided near the opening 106 of the foreign particle remover 103 thereby efficiently removing the foreign particles input through the opening 106. Here, the opening 106 may be a portion that corresponds to a border between the external space and the internal space of the foreign particle remover 105 in a cylindrical structure. In another way, the inlets 105 may be mainly disposed to the inside 109 of the foreign particle remover 103 provided near the inflow portions 104 to efficiently remove the foreign particles input through the inflow portions 104. The foreign particles input through the inlets 105 move to the main body portion 101 through an internal moving path 121 between the inside 109 and the outside 110 of the foreign particle remover 103. An air suctioning pump 120 may be formed on the main body portion 101, and the foreign particles are input to the foreign particle remover 103 through the inlets 105 by the air suctioning pump 120, so they may be discharged to the outside through the main body portion 101.

When the electrode and the separation film are wound by the above-noted structure, the inflow of foreign particles to the winding core 102 may be prevented, and the foreign particles may be efficiently removed through the inlet 105.

The foreign particle remover 103 is connected to the main body portion 101, and it is separable if needed.

FIG. 4 shows a schematic view of a winding device for manufacturing an electrode assembly according to another exemplary embodiment of the present invention.

Referring to FIG. 4, the winding device 200 for manufacturing an electrode assembly further includes a magnet 107 on a portion of the foreign particle remover 103 on which the inflow portion 104 is formed. For ease of description, one from among a plurality of magnets 107 is shown by an indication line as a representative. The magnet 107 separates the metallic foreign particles stuck to the electrode input to the inflow portion 104 and remove them. The metallic foreign particles may be generated in a process for incising the electrode, and they are heavier than a weight of non-metallic foreign particles so they may not be inhaled through the inlet 105. When the metallic foreign particles that are not removed are wound together with the electrodes, the electrode assembly is transformed and a short circuit is generated.

The portion in which the magnet 107 may be formed on the foreign particle remover 103 is not specifically limited. The magnet 107 may be formed on the inside 109 in addition to the outside 110 of the foreign particle remover 103, and if necessary, part or all of the foreign particle remover 103 may be formed to be a magnet.

FIG. 5 shows a schematic view of a winding device for manufacturing an electrode assembly according to another exemplary embodiment of the present invention.

Referring to FIG. 5, the winding device 300 for manufacturing an electrode assembly may further include a cover portion 108. The cover portion 108 is connected as a form for covering the opening 106 to the foreign particle remover 103. For the process for winding an electrode assembly, the cover portion 108 is combined to the foreign particle remover 103 to prevent foreign particles from being input through the opening 106. When the electrode assembly is wound, the cover portion 108 may be separated from the foreign particle remover 103, and the electrode assembly may be separated from the winding core 102.

Those of ordinary skill in the art to which the present invention belongs will be able to make various applications and modifications within the scope of the present invention.

INDUSTRIAL APPLICABILITY

As described above, the winding device for manufacturing an electrode assembly according to the present invention includes a foreign particle remover surrounding the winding core, and forms an inlet inside the foreign particle remover, thereby preventing the foreign particles from being input and efficiently removing the foreign particles that are input.

What is claimed is:

1. A winding device for manufacturing an electrode assembly, the winding device comprising:
   a main body portion;
   a winding core configured to wind an electrode and a separation film to form the electrode assembly; and
   a foreign particle remover connected to the main body portion, the foreign particle remover being configured to remove foreign particles from in between the winding core and the foreign particle remover,
   wherein the foreign particle remover surrounds the winding core while being spaced from the winding core, and
   wherein the foreign particle remover includes an inflow portion extending through an outer surface of the foreign particle remover through which the electrode and the separator enter while being wound by the winding core such that the foreign particle remover removes the foreign particles from in between the winding core and the foreign particle remover as the electrode and the separator enter the foreign particle remover through the inflow portion.

2. The winding device of claim 1, wherein
the foreign particle remover has a cylindrical structure.

3. The winding device of claim 2, wherein
a diameter of the foreign particle remover is greater than a diameter of at least the electrode assembly.

4. The winding device of claim 1, wherein
the foreign particle remover includes an inlet formed on an inside thereof.

5. The winding device of claim 4, wherein
the foreign particles suctioned through the inlet are discharged to an outside through the main body portion.

6. The winding device of claim 1, wherein
the foreign particle remover is separate separable from the main body portion.

7. The winding device of claim 1, wherein the foreign particle remover further includes a magnet.

8. The winding device of claim 7, wherein
The magnet is located on the foreign particle remover portion on which the inflow portion is located.

9. The winding device of claim 1, further comprising
a cover portion to cover an opening of the foreign particle remover.

10. The winding device of claim 9, wherein
the cover portion is spaced from the main body portion.

11. The winding device of claim 1, wherein the main body has a first end connected to the foreign particle remover and a second end connected to an air suction pump.

* * * * *